(12) United States Patent
Vasicek et al.

(10) Patent No.: US 9,157,482 B2
(45) Date of Patent: Oct. 13, 2015

(54) SHAFT ASSEMBLY WITH ANTI-PULL APART STAKE

(71) Applicant: STEERING SOLUTIONS IP HOLDING CORPORATION, Saginaw, MI (US)

(72) Inventors: Matthew D. Vasicek, Vassar, MI (US); Brandon G. Wynn, Bay City, MI (US); Zachery P. Schultz, Munger, MI (US); David G. Matousek, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/511,980

(22) Filed: Oct. 10, 2014

(65) Prior Publication Data

US 2015/0101443 A1 Apr. 16, 2015

Related U.S. Application Data

(60) Provisional application No. 61/889,726, filed on Oct. 11, 2013.

(51) Int. Cl.
| | |
|---|---|
| *B62D 1/18* | (2006.01) |
| *F16D 1/04* | (2006.01) |
| *B62D 1/16* | (2006.01) |
| *B62D 1/20* | (2006.01) |
| *F16D 1/08* | (2006.01) |

(52) U.S. Cl.
CPC .. *F16D 1/04* (2013.01); *B62D 1/16* (2013.01); *B62D 1/20* (2013.01); *F16D 1/0858* (2013.01); *F16D 2300/12* (2013.01)

(58) Field of Classification Search
USPC ............ 74/493; 464/149, 150, 157, 158, 162, 464/172; 403/377
See application file for complete search history.

(56) References Cited

U.S. PATENT DOCUMENTS

| | | | |
|---|---|---|---|
| 3,588,154 A * | 6/1971 | Voight et al. ..................... 3/300 |
| 3,832,076 A * | 8/1974 | Gehrke ..................... 403/359.5 |
| 3,962,931 A * | 6/1976 | Moneta ........................... 74/493 |
| 4,667,530 A | 5/1987 | Mettler et al. | |
| 5,538,474 A | 7/1996 | Kretschmer et al. | |
| 5,630,704 A * | 5/1997 | Gilgenbach et al. ....... 416/134 R |
| 6,026,704 A * | 2/2000 | Shibata et al. .................. 74/496 |
| 6,241,616 B1 | 6/2001 | Lightcap | |
| 6,540,618 B1 | 4/2003 | MacDonald et al. | |
| 7,198,425 B2 | 4/2007 | Bergkvist et al. | |
| 7,322,607 B2 * | 1/2008 | Yamada et al. ................ 280/755 |
| 7,559,267 B2 * | 7/2009 | Yamada ........................... 74/493 |
| 7,687,151 B2 * | 3/2010 | Finton et al. .................. 428/586 |
| 8,491,408 B2 * | 7/2013 | Beach et al. ................... 473/296 |

* cited by examiner

*Primary Examiner* — Toan To
(74) *Attorney, Agent, or Firm* — Cantor Colburn LLP

(57) ABSTRACT

In accordance with an exemplary embodiment of the invention, a shaft coupling is provided. The shaft coupling comprises a first shaft having a splined outer surface, a tubular second shaft having an end surface and a splined inner surface, the second shaft receiving the first shaft along a longitudinal axis of the second shaft, and at least one stake extending axially into the second shaft end surface. The at least one stake deforms at least a portion of the splined inner surface to facilitate an interference fit between the first and second shafts and configured to resist a predetermined axial separation load being applied to the first and second shafts.

16 Claims, 2 Drawing Sheets

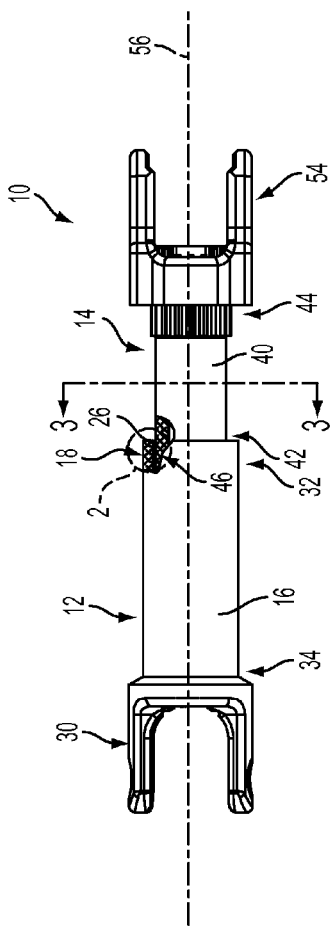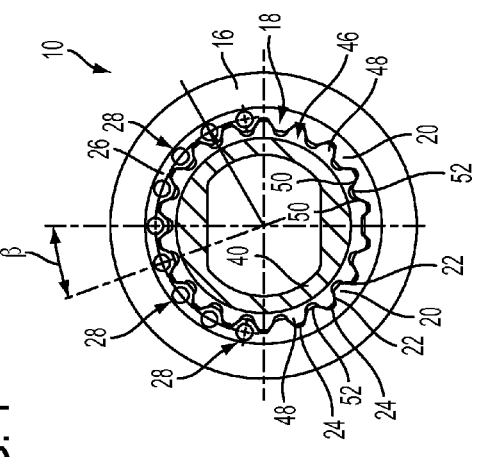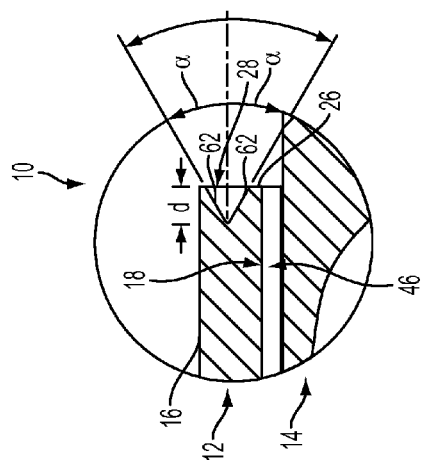

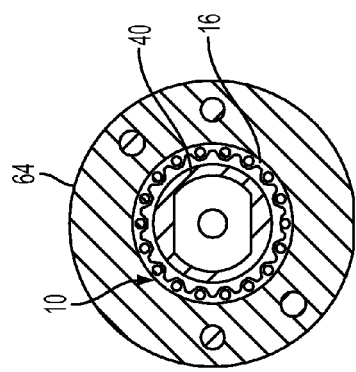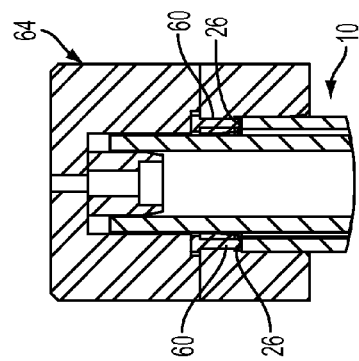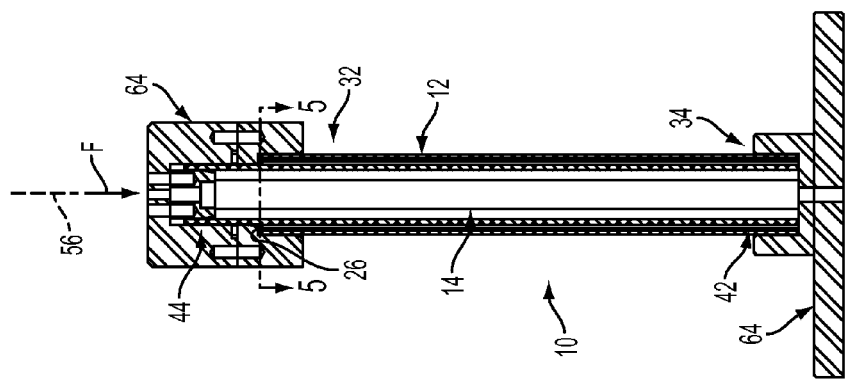

SHAFT ASSEMBLY WITH ANTI-PULL APART STAKE

CROSS REFERENCE TO RELATED APPLICATION

This application claims the benefit of U.S. Provisional Application Ser. No. 61/889,726, filed Oct. 11, 2013, the contents of which are incorporated herein by reference thereto.

BACKGROUND OF THE INVENTION

The following description relates to shaft assemblies, and more particularly, to a steering column assembly with anti-pull apart features.

In some known tubular shaft assemblies having two or more shafts, angled stakes are formed on the outer diameter of one tubular shaft to prevent another shaft being removed from the tubular shaft. However, with some assemblies, angled stakes may create an interference condition that causes high stroke efforts and undesired drag, thereby preventing achievement of a required minimum pull-apart load.

Accordingly, it is desirable to provide a steering column assembly that both achieves the minimum pull-apart load and prevents an undesired interference between two shafts.

SUMMARY OF THE INVENTION

In accordance with an exemplary embodiment of the invention, a shaft coupling is provided. The shaft coupling comprises a first shaft having a splined outer surface, a tubular second shaft having an end surface and a splined inner surface, the second shaft receiving the first shaft along a longitudinal axis of the second shaft, and at least one stake extending axially into the second shaft end surface. The at least one stake deforms at least a portion of the splined inner surface to facilitate an interference fit between the first and second shafts and configured to resist a predetermined axial separation load being applied to the first and second shafts.

In accordance with another exemplary embodiment of the invention, a steering shaft assembly is provided. The assembly includes a first shaft having a first end, a second end, and a splined outer surface. A tubular second shaft includes a first end, a second end having an end surface, and a splined inner surface. The second shaft second end receives the first shaft first end along a longitudinal axis of the second shaft. At least one stake extends axially into the second shaft end surface. The at least one stake is configured to deform at least a portion of the splined inner surface to facilitate an interference fit between the first and second shafts and configured to resist a predetermined axial separation load being applied to the first and second shafts.

In accordance with yet another exemplary embodiment of the invention, a method of manufacturing a shaft coupling is provided. The method includes providing a first shaft having a splined outer surface, providing a tubular second shaft having an end surface and a splined inner surface, the second shaft receiving the first shaft along a longitudinal axis of the second shaft, and providing a die pot having at least one pin. The method further includes disposing the first and second shafts in the die pot such that the at least one pin is oriented against the second shaft end surface, and forcing the at least one pin into the second shaft end surface to form at least one stake extending axially into the second shaft end surface. The at least one stake is configured to deform at least a portion of the splined inner surface to facilitate an interference fit between the first and second shafts preventing axial removal of first shaft from second shaft until a predetermined axial load is applied to the first and second shafts.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a side view of an exemplary shaft assembly;

FIG. 2 is a cross-sectional view of a portion of the shaft assembly shown in FIG. 1 taken along Section 2;

FIG. 3 is a cross-sectional view of the shaft assembly taken along line 3-3 of FIG. 1;

FIG. 4 is a cross-sectional view of an exemplary shaft and die pot assembly;

FIG. 5 is a cross-sectional view of the shaft and die pot assembly taken along line 5-5 of FIG. 4; and FIG. 6 is a cross-sectional view of a portion of the shaft and die pot assembly shown in FIG. 4.

DETAILED DESCRIPTION

Referring now to the Figures, where the invention will be described with reference to specific embodiments, without limiting same, FIGS. 1-3 illustrate an exemplary shaft assembly 10. In the exemplary embodiment, assembly 10 is a steering column shaft assembly that includes a first shaft section 12 and a second shaft section 14 sliding disposed within first shaft section 12. However, assembly 10 may be any type of suitable shaft assembly.

First shaft section 12 includes a tubular shaft body 16 having a first end 32, a second end 34, and a splined section 18 formed on the inner surface or diameter of tubular shaft body 16. Splined section 18 is configured to engage second shaft section 14 and includes a plurality of teeth 20 defined by tapered surfaces 22 and involute surfaces 24 (FIG. 3). Alternatively, surfaces 24 may be straight sided. Shaft first end 32 includes an end surface 26 having a plurality of stakes 28 formed therein, as is described herein in more detail. Shaft second end 34 may include an attachment member 30 (e.g., a yoke) adapted to enable other portions of a steering device to be connected with steering column assembly 10.

Second shaft section 14 includes a solid shaft body 40 having a first end 42, a second end 44, and a splined section 46 formed on the outer diameter of shaft body 40. Splined section 46 is configured to engage first shaft splined section 18 and includes a plurality of teeth 48 defined by tapered surfaces 50 and involute surfaces 52 (FIG. 3). Splined section 46 may include a plastic overmolding (not shown) or may be entirely formed from a different material than shaft body 40 (e.g., plastic). Shaft second end 44 may include an attachment member 54 (e.g., a yoke) adapted to enable other portions of a steering device (not shown) to be connected with steering column assembly 10. Moreover, first and second shaft sections 12, 14 may be formed from any suitable material such as, for example, aluminum or steel.

In the exemplary embodiment, second shaft section 14 telescopes within first shaft section 12 along a longitudinal translation axis 56. In a fully extended position, due to stakes 28, at least a portion of splined section 18 interferes with splined section 46 to prevent or resist second shaft section 14 from being separated or pulled apart from first shaft section 12 until a minimum predetermined axial separation or pull-apart load is met. In one embodiment, the pull-apart load is, for example, between 300N and 350N or between approximately 300N and approximately 350N. In another embodiment, the pull-apart load is at least 250N or at least approximately 250N. However, assembly 10 may be designed with any desired pull-apart load, as described herein in more detail.

In the exemplary embodiment, each stake 28 is formed in first shaft end surface 26 substantially within one tooth 20 by punching or pressing a pin 60 (FIG. 6) into end surface 26. As such, tooth 20 and/or tubular shaft body 16 are deformed and create an interference fit with splined section 46 of second shaft section 14 when steering column assembly 10 is in a fully extended position. For example, the angle of orientation (i.e., the flank angle) of tapered surfaces 22 is altered during the deformation and portions of each deformed tooth 20 extend into a hollow area of tubular shaft body 16 (e.g., between adjacent teeth 48) and will engage teeth 48 if first and second shaft sections 12, 14 are in a fully extended position.

As illustrated in FIG. 3, assembly 10 includes splined sections 18, 46 each with eighteen teeth. Nine stakes 28 are formed in half of splined section 18 to form a semi-circle, which produces the desired pull-apart load. However, splined sections 18, 46 may alternatively be formed with any suitable number of teeth or in any pattern around the circumference of first shaft end surface 26 that enables assembly 10 to function as described herein. Similarly, splined section 18 may be formed with any number of stakes 28 that enables assembly 10 to function as described herein.

As illustrated in FIG. 2, each stake 28 is substantially conical and includes inner walls or tapered edges 62 converging at a depth 'd' and at an angle 'α'. In one exemplary embodiment, angle 'α' is between 50° and 70° or between approximately 50° and approximately 70°. In other embodiments, angle 'α' is 60° or approximately 60°. However, edges 62 may be angled at any angle that enables assembly 10 to function as described herein. Moreover, each stake 28 may be formed at any suitable depth 'd'. Alternatively, stake 28 may have any suitable shape that enables assembly 10 to function as described herein. For example, the profile of stake 28 may include a chisel point, a diamond point, a triangular point, or the like.

By adjusting depth 'd' and 'α', the amount, the shape, and/or circumferential pattern of the deformation of teeth 20 may be adjusted to tune the "pull-apart force", which enables the pull-apart load to be adjustably controlled for a desired application. For example, a certain shipping method may require a higher pull-apart load than a typical shipping method, and depth 'd' and angle 'α' may be accordingly adjusted to assure first and second shaft sections 12, 14 do not pull apart during loads encountered for that certain shipping method. As such, the geometry of stakes 28 provide a positive anti-pull apart feature without impacting the slip load of first and second shaft sections 12, 14. The flank angle interference between first shaft section 12 and second shaft section 14 provides a positive anti-pull apart feature at their fully extended travel positions. Accordingly, slip load performance is not degraded either at the application of stake 28 or after shaft assembly 10 has been bottomed out in the fully extended position.

With reference to FIGS. 4-6, an exemplary method of manufacturing steering column assembly 10 includes inserting second shaft section 14 into first shaft section 12. A die pot 64 is provided with a desired number of pins 60 (FIG. 6) corresponding to a desired number of stakes 28, and die pot 64 encapsulates shaft first end 32 in the axial position along axis 56 (FIGS. 4 and 6). As shown in FIG. 4, a force 'F' is placed on die pot 64 in the axial direction, and pins 60 form stakes 28 in end surface 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A shaft coupling comprising:
   a first shaft having a splined outer surface;
   a tubular second shaft having an end surface and a splined inner surface, the second shaft receiving the first shaft along a longitudinal axis of the second shaft; and
   at least one stake extending axially into the second shaft end surface, the at least one stake configured to deform at least a portion of the splined inner surface to facilitate an interference fit between the first and second shafts and configured to resist a predetermined axial separation load being applied to the first and second shafts.

2. The shaft coupling of claim 1, wherein the at least one stake is conical.

3. The shaft coupling of claim 1, wherein the at least one stake comprises a plurality of stakes extending axially into the second shaft end surface, wherein the plurality of stakes are only formed on one half of the second shaft end surface.

4. The shaft coupling of claim 1, wherein the splined inner surface comprises a plurality of teeth each having tapered edges oriented at a flank angle, and wherein each stake of the at least one stake deforms one tooth of the plurality of teeth such that the flank angle of the staked tooth is different from the flank angle of a non-staked tooth.

5. The shaft coupling of claim 1, wherein the at least one stake comprises inner edges oriented at an angle relative to the longitudinal axis.

6. The shaft coupling of claim 5, wherein the angle is between 50° and 70°.

7. The shaft coupling of claim 5, wherein the angle is approximately 60°.

8. A steering shaft assembly comprising:
   a first shaft having a first end, a second end, and a splined outer surface;
   a tubular second shaft having a first end, a second end having an end surface, and a splined inner surface, the second shaft second end receiving the first shaft first end along a longitudinal axis of the second shaft; and
   at least one stake extending axially into the second shaft end surface, the at least one stake configured to deform at least a portion of the splined inner surface to facilitate an interference fit between the first and second shafts and configured to resist a predetermined axial separation load being applied to the first and second shafts.

9. The steering shaft assembly of claim 8, further comprising a first yoke coupled to the first shaft second end, and a second yoke coupled to the second shaft first end.

10. The shaft coupling of claim 8, wherein the at least one stake is conical.

11. The shaft coupling of claim 8, wherein the at least one stake comprises a plurality of stakes extending axially into the second shaft end surface, wherein the plurality of stakes are only formed on one half of the second shaft end surface.

12. The shaft coupling of claim 8, wherein the splined inner surface comprises a plurality of teeth each having tapered edges oriented at a flank angle, and wherein each stake of the at least one stake deforms one tooth of the plurality of teeth such that the flank angle of the staked tooth is different from the flank angle of a non-staked tooth.

13. The shaft coupling of claim 8, wherein the at least one stake comprises inner edges oriented at an angle relative to the longitudinal axis.

14. The shaft coupling of claim 13, wherein the angle is between 50° and 70°.

15. The shaft coupling of claim 13, wherein the angle is approximately 60°.

16. A method of manufacturing a shaft coupling, the method comprising:

providing a first shaft having a splined outer surface;

providing a tubular second shaft having an end surface and a splined inner surface, the second shaft receiving the first shaft along a longitudinal axis of the second shaft;

providing a die pot having at least one pin;

disposing the first and second shafts in the die pot such that the at least one pin is oriented against the second shaft end surface; and forcing the at least one pin into the second shaft end surface to form at least one stake extending axially into the second shaft end surface, the at least one stake configured to deform at least a portion of the splined inner surface to facilitate an interference fit between the first and second shafts preventing axial removal of first shaft from second shaft until a predetermined axial load is applied to the first and second shafts.

* * * * *